United States Patent
Kothandapani et al.

(10) Patent No.: US 9,461,948 B2
(45) Date of Patent: Oct. 4, 2016

(54) SYSTEM HAVING A GATEWAY FOR PROVIDING EMAIL BASED ON INTEREST IN SUBSCRIBER PROFILE

(71) Applicant: American Megatrends, Inc., Norcross, GA (US)

(72) Inventors: Govind Kothandapani, Snellville, GA (US); Anbarasu Sethupandian, Norcross, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 322 days.

(21) Appl. No.: 14/164,213

(22) Filed: Jan. 26, 2014

(65) Prior Publication Data
US 2015/0215420 A1    Jul. 30, 2015

(51) Int. Cl.
*H04L 12/58* (2006.01)
*H04L 12/24* (2006.01)
*G06F 17/30* (2006.01)
*H04L 12/18* (2006.01)
*H04L 29/08* (2006.01)

(52) U.S. Cl.
CPC ......... *H04L 51/08* (2013.01); *G06F 17/30769* (2013.01); *H04L 12/1859* (2013.01); *H04L 12/58* (2013.01); *H04L 12/585* (2013.01); *H04L 12/5855* (2013.01); *H04L 41/026* (2013.01); *H04L 51/12* (2013.01); *H04L 51/14* (2013.01); *H04L 67/26* (2013.01); *H04L 67/306* (2013.01)

(58) Field of Classification Search
CPC ...................... G06F 17/2288; G06F 17/30867; G06F 17/30991; G06F 21/335; G06F 21/55; G06F 17/30769; G06Q 10/107; G06Q 10/10; H04L 12/1895; H04L 63/08; H04L 12/58; H04L 12/585; H04L 12/5855; H04L 41/026; H04L 51/12; H04M 3/42
See application file for complete search history.

(56) References Cited

U.S. PATENT DOCUMENTS

| 8,434,095 B2 | 4/2013 | Yu | |
|---|---|---|---|
| 2003/0131073 A1* | 7/2003 | Lucovsky | G06F 21/335 709/219 |
| 2005/0132016 A1* | 6/2005 | Boone | G06Q 10/10 709/207 |
| 2007/0100950 A1* | 5/2007 | Bornstein | G06Q 10/107 709/206 |

(Continued)

OTHER PUBLICATIONS

St. Juste et al. "Litter: A Lightweight Peer-to-Peer Microblogging Service", IEEE Intl Conf on Privacy, Security, Risk and Trust, pp. 900-903 (2011).

(Continued)

*Primary Examiner* — Le Luu
(74) *Attorney, Agent, or Firm* — Jennifer P. Medlin

(57) ABSTRACT

A gateway for distributing content receives a subscriber profile from a subscriber device. The subscriber profile indicates content in which a user associated with the subscriber device is interested. Content is received by the gateway in an electronic mail message addressed to the gateway. The received content is parsed to determine whether the received content contains the content in which the subscriber profile indicates an interest. If the received content is determined to contain the content in which the subscriber profile indicates an interest, the received content is provided to the subscriber device.

20 Claims, 4 Drawing Sheets

(56) References Cited

U.S. PATENT DOCUMENTS

| | | | | |
|---|---|---|---|---|
| 2007/0143425 | A1* | 6/2007 | Kieselbach | G06F 17/2288 709/206 |
| 2007/0143428 | A1* | 6/2007 | Kumar | G06Q 10/107 709/206 |
| 2009/0144374 | A1* | 6/2009 | Laborde | G06Q 10/107 709/206 |
| 2010/0199188 | A1* | 8/2010 | Abu-Hakima | H04L 12/1895 715/733 |
| 2011/0213869 | A1* | 9/2011 | Korsunsky | G06F 21/55 709/223 |
| 2014/0019443 | A1* | 1/2014 | Golshan | G06F 17/30867 707/723 |
| 2014/0025692 | A1* | 1/2014 | Pappas | G06F 17/30867 707/754 |
| 2014/0141822 | A1* | 5/2014 | Hu | H04M 3/42 455/466 |
| 2015/0081670 | A1* | 3/2015 | Ali | G06F 17/30991 707/722 |
| 2015/0156183 | A1* | 6/2015 | Beyer | H04L 63/08 726/4 |

OTHER PUBLICATIONS

Porting Android to Devices, https://source.android.com/devices/index.html, 3pp (Printed Jan. 26, 2014).

De Cristofaro et al. "Tweeting with Hummingbird: Privacy in Large-Scale Micro-Slogging OSNs", http://sites.computer.org/debull/A12dec/humming.pdf, 8pp (2012).

Collins, Matthew "Advanced Computing and information Systems Laboratory: Social VPN—Litter Project", https://www.acis.ufl.edu/news/social-vpn-litter-project, 1p (Feb. 7, 2012).

* cited by examiner

SYSTEM HAVING A GATEWAY FOR PROVIDING EMAIL BASED ON INTEREST IN SUBSCRIBER PROFILE

TECHNICAL FIELD

The present disclosure relates generally to distribution of content, and, more particularly, to electronic mail based distribution of content.

BACKGROUND

Electronic mail has long been used to distribute information to individuals at different geographic locations. Traditionally, electronic mail has been provided over a public network, e.g., the Internet, via an email service provider, such as gmail or Yahoo.

More recently, virtual private networks (VPNs) have allowed a private network to be extended across a public network. A VPN enables a computer to send and receive data across shared or public networks as if the computer were directly connected to the private network, while benefitting from the functionality, security and management policies of the private network. This is done by establishing a virtual point-to-point connection through the use of dedicated connections, encryption, or a combination of the two.

VPNs allow employees to securely access their company's intranet while traveling outside the office. Similarly, VPNs securely and cost effectively connect geographically disparate offices of an organization, creating one cohesive virtual network.

While VPNs are useful, they require a log-in. Also, VPNs suffer the same drawback as traditional email in that the email addresses of recipients have to be entered to send an email message. This may be a tedious process for an email sender if there are a large number of intended email recipients. This becomes even more of a problem if the email sender does not know the email addresses of the recipients or does not know exactly who should be a recipient.

Another problem with traditional email and VPNs is that a recipient may or may not be interested in the email. As the number of emails that recipients receive grows, an email that may actually be of interest to a recipient may be missed among a large number of received emails.

Internet forums offer an alternative to email for distributing information. Using forums, individuals do not have to be separately addressed. However, to obtain information, individuals must visit the Internet forum by logging in. This may present a problem if a sender of content wants to distribute information to a large number of recipients at a given time. Any intended recipient that is not engaged in the forum at the given time may miss important information.

Another problem with internet forums is that they are controlled by a central forum administrator that keeps track of individuals that are part of various forums. To become part of a forum, an individual must coordinate with the central forum administrator. This may slow down or inhibit the distribution of information, as individuals with an interest in the information may not be aware of or have a desire to engage in a forum for distribution of the information.

It is with respect to these and other considerations that the disclosure presented herein has been made.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

According to one embodiment, a method is provided for distributing content. The method includes receiving a subscriber profile from at least one subscriber device. The subscriber profile indicates content in which a user associated with the subscriber device is interested. The method further includes receiving content, in an electronic mail message and parsing the received content to determine whether the received content contains the content in which the subscriber profile indicates an interest. The method further includes providing the received content to the subscriber device responsive to determining that the received content contains the content in which the subscriber profile indicates an interest.

According to another embodiment, a gateway for distributing content includes a processor and a memory. The memory has instructions stored thereon which, when executed by the processor, cause the processor to perform operations. The operations include receiving a subscriber profile from at least one subscriber device. The subscriber profile indicates content in which a user associated with the subscriber device is interested. The operations further include receiving content in an electronic mail message addressed to the gateway and parsing the received content to determine whether the received content contains the content in which the subscriber profile indicates an interest. The operations further include providing the received content to the subscriber device responsive to determining that the received content contains the content in which the subscriber profile indicates an interest.

According to another embodiment, a computer readable storage device has instructions stored thereon which, when executed by a processor, cause the processor to perform operations for distributing content. The operations include receiving a subscriber profile from at least one subscriber device. The subscriber profile indicates content in which a user associated with the subscriber device is interested. The operations further include receiving content in an electronic mail message and parsing the received content to determine whether the received content contains the content in which the subscriber profile indicates an interest. The operations further include providing the received content to the subscriber device responsive to determining that the received content contains the content in which the subscriber profile indicates an interest.

DETAILED DESCRIPTION

Detailed exemplary embodiments are disclosed herein. It must be understood that the embodiments described and illustrated are merely examples that may be embodied in various and alternative forms, and combinations thereof. As used herein, the word "exemplary" is used expansively to refer to embodiments that serve as examples or illustrations. The figures are not necessarily to scale and some features may be exaggerated or minimized to show details of particular components. Specific structural and functional details disclosed herein are not to be interpreted as limiting.

Figure 1:
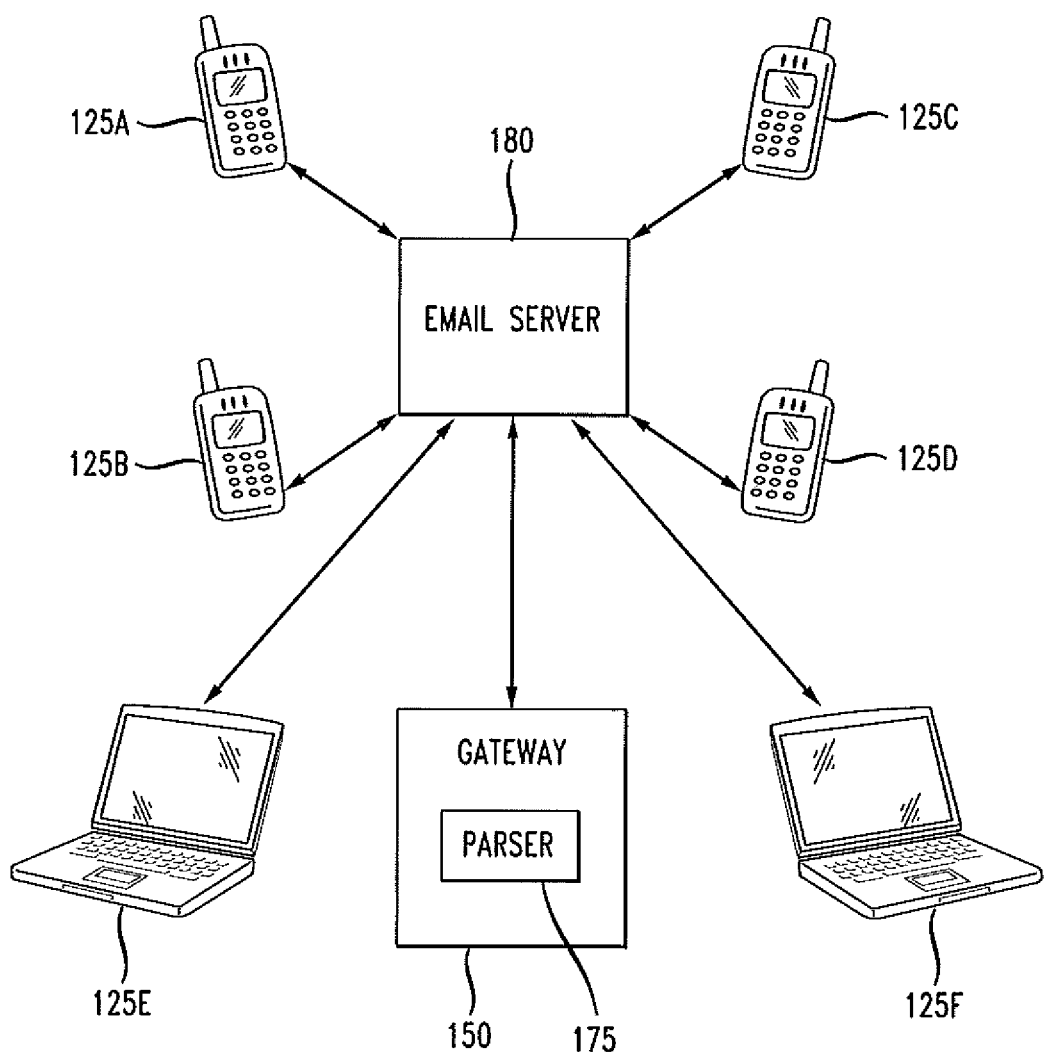
FIG. 1 illustrates a system in which exemplary embodiment may be implemented.

FIG. 1 illustrates a system for distributing content according to an exemplary embodiment. Referring to FIG. 1, a gateway 150 receives content from and distributes content to subscriber devices 125A, 125B, 125C, 125D, 125E and 125F via an email server 180. The email server 180 may be included in a communication network, such as the Internet. Although only one email server 180 is shown for simplicity of illustration, it should be appreciated that there may be multiple email servers in communication with the gateway 150 and/or the subscriber devices 125A, 125B, 125C, 125D, 125E and 125F. The gateway 150 and the subscriber devices 125A, 125B, 125C, 125D, 125E and 125F include email clients of the email server 180.

According to illustrative embodiments, the content received and distributed by the gateway 150 may include, e.g., data, control signals, scripts, hash tags, keywords, tasks, read instructions, write instructions, etc. The gateway 150 also receives subscriber profiles, e.g., from the subscriber devices 125A, 125B, 125C, 125D, 125E and 125F. Each subscriber profile may be associated with an authorized user of each subscriber device. The subscriber profile received from a particular subscriber device indicates content in which the authorized user of the subscriber device may be interested. The subscriber profile may contain hash tags, keywords, scripts, etc., that may be used to parse received content as described below. The subscriber profile may also include information indicating senders from which the authorized user is interested in receiving content from, as well as an indication as to which senders are authorized to send certain content to the authorized user. For example, a subscriber profile may authorize a limited group of senders from which tasks may be received and automatically assigned.

The subscriber profile may be sent from the subscriber devices to the gateway 150 in an email message at the same time that content is sent or in a separate email message. Also, subscriber profiles may be updated at any time, as the interests of the authorized user of a subscriber device changes. Thus, content may be dynamically disseminated to different groups of subscriber devices, without the need for a central administrator to control the dissemination of content.

Figure 2:
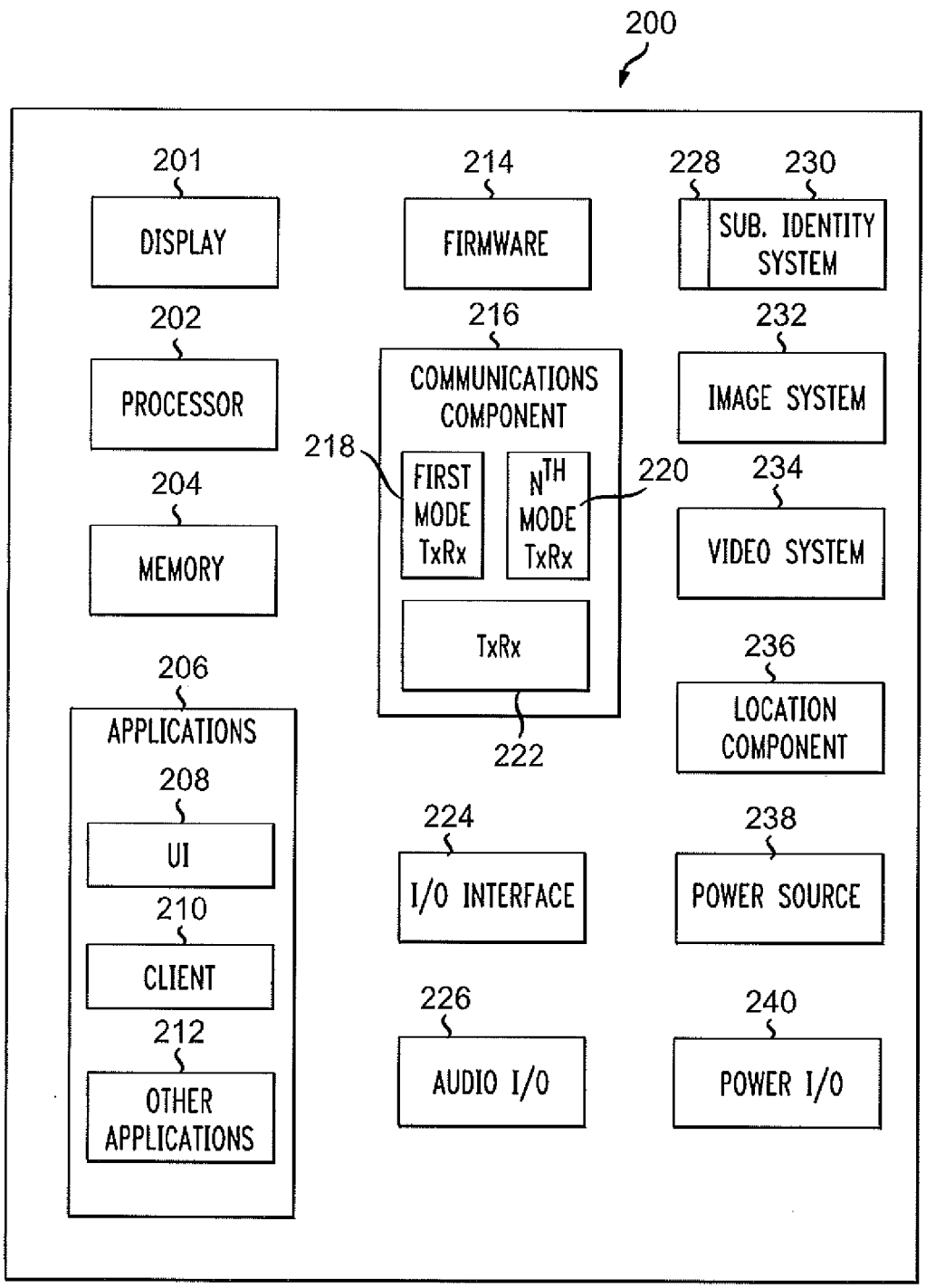
FIG. 2 illustrates a block diagram of a subscriber device which may send and receive content according to an exemplary embodiment.

The subscriber devices 125A, 125B, 125C, 125D, 125E, and 125F may include, e.g., cellular phones, laptops, tablets, personal computers, MA's, etc. An example of a subscriber device is shown in FIG. 2. Although only six subscriber devices are shown for simplicity of illustration, it should be appreciated that any number of subscriber devices may be used. The gateway 150 may be implemented with a computing system, such as that illustrated in FIG. 3. The email server 180 may be implemented with a computing system similar to that shown in FIG. 3.

The gateway 150 includes a parser 175 that parses content received from the subscriber devices to determine which subscriber devices should receive the content. Parsing is based on subscriber profiles received from each of the subscriber devices and involves matching information in the content, e.g., keywords, with information in the subscriber profiles. The gateway 150 delivers content to the subscriber devices based on the parsing such that content is delivered to those subscriber devices with associated subscriber profiles that indicate an interest in the content.

In addition to receiving subscriber profiles and receiving and distributing content, the gateway 150 authenticates the email addresses of the subscriber devices. According to one embodiment, the gateway 150 authenticates an email address of a subscriber device by determining whether a domain name associated with an email address of the gateway 150 matches the domain name associated with an email address of the subscriber device. However, it should be appreciated that other authentication techniques may be used, and the domain name associated with the email address of the gateway 150 does not necessarily have to be the same as the domain name associated with the email address of a subscriber device for the email address of the subscriber device to be authenticated.

As an illustrative example of how the gateway 150 works, consider a scenario in which authorized users of subscriber devices 125A, 125C, 125D and 125F are interested in a particular topic. For illustrative purposes, the topic may be referred to as "TopicA". The subscriber devices 125A, 125C, 125D, and 125F will each send an email message addressed to the gateway 150. Each email message will include a subscriber profile indicating an interest in TopicA. For example, the subscriber profile from each subscriber device 125A, 125C, 125D and 125F may include a keyword "TopicA" indicating an interest in TopicA. The gateway 150 will receive the email messages and store the subscriber profiles, e.g., in a database.

Then, suppose that an authorized user of subscriber device 125A wants to distribute updated information about TopicA. In this scenario, an email containing the information about TopicA will be sent from subscriber device 125A to the gateway 150 (via the email server 180), with an indication that the information relates to TopicA. The indication may simply be the keyword "TopicA". The email from the subscriber device 125A may also contain a marker indicating that the information is an update regarding TopicA, such that the gateway 150 does not then resend the same information back to subscriber device 125A. The parser 175 will determine, based on the stored subscriber profiles from subscriber devices 125C, 125D, and 125F, that the information includes content that authorized users of the subscriber devices 125C, 125D, and 125F are interested in. The parser 175 may make this determination by matching the keyword "TopicA" included in the email message from the subscriber device 125A with the keyword "TopicA" included in the subscriber profiles associated with the subscriber devices 125C, 125D, and 125F. Then, the gateway 150 will deliver the content regarding TopicA contained in the email message from the subscriber device 125A to the subscriber devices 125C, 125D, and 125F as an email message (via the email sever 180).

It should be appreciated that the email message from the subscriber device 125A may also include additional information regarding other topics that may or may not be of interest to the subscribers 125C, 125D, and 125F. Such additional information may also be parsed and distributed to subscriber devices that have indicated an interest in the information in a manner similar to that described above.

As another example, consider an email message from subscriber device 125A having content including a task. The gateway 150 receives the email message (via the email server 180), and the parser 175 parses the content to determine whether any subscriber profiles have indicated an interest in the task and have authorized that a task be assigned by subscriber device 125A. Assume that the subscriber profiles from subscriber devices 125C and 125D have both indicated an interest in the task and have authorized that a task be assigned by the subscriber device 125A. In this case, the gateway 150 may automatically assign the task and add the task to the task list of subscriber devices 125C and/or 125D. Once the task is assigned, it may be purged, such that if another subscriber profile indicates an interest and an authorization for the task, the task will not be reassigned.

Figure 3:
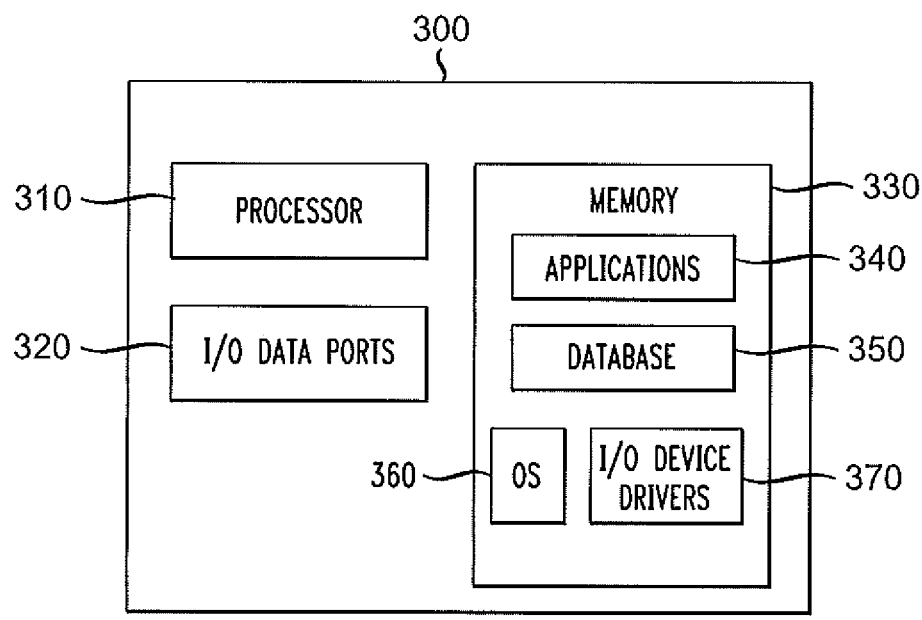
FIG. 3 is a block diagram of a computing system with which a gateway for distributing content may be implemented according to an exemplary embodiment.

FIG. 2 illustrates a schematic block diagram of an exemplary subscriber device, and FIG. 3 illustrates a block diagram of a computing system with which a gateway for distributing content may be implemented, according to exemplary embodiments. Although no connections are shown between the components illustrated in FIGS. 2 and 3, those skilled in the art will appreciate that the components can interact with each other via any suitable connections to carry out device functions.

It should be understood that FIGS. 2 and 3 and the following description are intended to provide a brief, general description of a suitable environment in which the various aspect of some embodiments of the present disclosure can be implemented. While the description includes a general context of computer-executable instructions, the present disclosure can also be implemented in combination with other program modules and/or as a combination of hardware and software in addition to, or instead of, computer readable instructions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims, can include storage media, excluding propagating signals. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed by the devices shown in FIGS. 2 and 3.

Referring to FIG. 2, a subscriber device 200 may be a multimode handset and can include a variety of computer-readable media. The device 200 may include a display 201 for displaying multimedia, such as, for example, text, images, video, and telephone functions, such as Caller ID data, setup functions, menus, music metadata, messages, wallpaper, graphics, Internet content, device status, preference settings, and the like. The display 201 may also display content that is delivered to the device 200 responsive to the parser 175 determining that the subscriber profile associated with the device 200 indicates that there is an interest in the content.

The device 200 may include a processor 202 for controlling and/or processing data. A memory 204 can interface with the processor 202 for the storage of data and/or applications 206.

The applications 206 may include, for example, an electronic mail client, SMS messaging software, EMS message software, MMS messaging software, USSD software, a WAP browser, and the like.

The applications 206 may also include a user interface (UI) application 208. The UI application 208 can interact with a client 210 (e.g., an operating system) to facilitate user interaction with device functionality and data. For example, the UI application 208 may be used for entering message content, viewing received messages, answering/initiating calls, entering/deleting data, password entry and settings, configuring settings, address book manipulation, and the like. Such user interaction may be facilitated via, e.g., a keypad or a touchscreen included in the device 200 or communicating with the device via the I/O interface 224. Also, according to exemplary embodiments, the UI application 208 can be used for inputting a subscriber profile indicating content in which an authorized user of the device 200 is interested.

The applications 206 may include other applications 212, such as, for example, add-ons, plug-ins, email applications (that act as clients of the email server 180), music applications, video applications, camera applications, location-based service (LSB) applications, power conservation applications, game applications, productivity application, entertainment applications, combinations thereof, and the like, as well as subsystem and/or components.

The applications 206 can be stored in the memory and/or in firmware components 214 and can be executed by the processor 202. The firmware 214 can also store code for execution during initialization of the device 200.

A communications component 216 may interface with the processor 202 to facilitate wired/wireless communication with external systems including, for example, cellular networks, location systems, VoIP networks, local area networks (LAN's), wide area networks (WAN's), metropolitan area networks (MAN's), personal area networks (PAN's), the Internet, and other networks, which may be implemented using WIFI, WIMAX, combinations and improvements thereof, and the like. The communications component 216 can also include a multimode communication subsystem for providing cellular communications via different cellular technologies. For example, a first cellular transceiver 218 can operate in one mode, for example, GSM, and an Nth transceiver 220 can operate in a different mode, for example UMTS. While only two transceivers 218, 220 are illustrated, it should be appreciated that a plurality of transceivers may be included. The communications component 216 may also include a transceiver 222 for other communication technologies, such as, for example, WIFI, WIMAX, BLUETOOTH, infrared, IRDA, NFC, RF, and the like. The communications components 216 may also facilitate reception from terrestrial radio networks, digital satellite radio networks, Internet based radio service networks, combinations thereof, and the like.

The communications component 216 can process data from the email server 180 via a network, such as, for example, the Internet, via an ISP, DSL provider, or broadband provider. The communications component 216 can be used to communicate content and subscriber profiles to the gateway 150 via the email server 180. Also, the communications component 216 may be used to receive content to in which an authorized user of the device 200 has indicated an interest from the gateway 150 via the email server 180.

An input/output (I/O) interface 224 may be provided for input/output of data and/or signals. The I/O interface 224 may be a hardwire connection, such as, for example, a USB, mini-USB, audio jack, PS2, IEEE 1394, serial, parallel, Ethernet (RJ48), RJ11, and the like, and can accept other 110 devices such as, for example, keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), combination thereof, and the like. It should be appreciated that the I/O interface 224 can be used for communication between the device and a network or local device instead of, or in addition to, the communications component 216.

Audio capabilities may be provided by an audio I/O component 226 that may include a speaker for the output of audio signals and a microphone to collect audio signals.

The device 200 can include a slot interface 228 for accommodating a subscriber identity system 230 such as, for example, a subscriber identity module (SIM) or universal SIM (USIM). The subscriber identity system 230 instead can be manufactured into the device 200, thereby obviating the need for a slot interface 228. In some embodiments, the subscriber identity system 230 can store certain features, user characteristics, rules, policies, models, contact information, and the like. The subscriber identity system 230 can be programmed by a manufacturer, a retailer, a user, a computer, a network operator, and the like.

The device 200 can further include an image capture and processing system 232 (image system). Photos and/or videos can be obtained via an associated image capture subsystem of the image system 232, for example, a camera. The device 200 may also include a video system 234 for capturing, processing, recording, modifying, and or transmitting video content.

A location component 236 may be included to send and/or receive signals such as, for example, GPS data, A-GPS data, WIF/WIMAX and or cellular network triangulation data, combinations thereof, and the like. The location component 236 can interface with cellular network nodes, telephone lines, and satellites, location transmitters and/or beacons, wireless network transmitters and receivers, for example, WIFI hotspots, radio transmitters, combinations thereof and the like. The device 200 may obtain, generate, and/or receive data to identify its location or can transmit data used by other devices to determine the device location.

The device 200 may also include a power source 238, such as batteries and/or other power subsystems (AC or DC). The power source 238 can interface with an exemplary power system or charging equipment via a power I/O component 240.

FIG. 3 is a block diagram of a computing device 300 with which the gateway 150 shown in FIG. 1 may be implemented. According to an exemplary embodiment, the computing device 300 may be a client of an electronic mail messaging service facilitated by the email server 180, but from the perspective of subscriber devices 125A, 125B, 125C, 125D, 125E and 125F, the computing device 300 acts as a gateway. The computing device 300 may be implemented in any suitable computing device and on any suitable network. According to an exemplary embodiment, the computing device 300 may be implemented on a local network, e.g., a LAN, connected to a public network, e.g., the Internet.

Referring to FIG. 3, the computing device 300 includes a processor 310 that receives inputs, e.g., subscriber profiles and content, from subscriber devices, and transmits outputs, e.g., content matching subscriber profiles, via I/O Data Ports 320. The I/O Data Ports 320 can be implemented with, e.g., an interface including an antenna or other suitable type of transceiver through which data and signals may be transmitted and received wired and/or wirelessly.

The computing device 300 also includes a physical hard drive (not shown). The processor 310 communicates with the memory 330 and the hard drive via, e.g., an address/data bus (not shown). The processor 310 can be any commercially available or custom microprocessor. The memory is 330 is representative of the overall hierarchy of memory devices containing the software and data used to implement the functionality of the device 300. The memory 330 can include, but is not limited to the types of memory devices described above. As shown in FIG. 3, the memory 330 may include several categories of software and data used in the device 300, including applications 340, a database 350, an operating system (OS) 360, and input/output (I/O) device drivers 370.

The I/O device drivers 370 may include various routines accessed through at least one of the OS 360 by the applications 340 to communicate with devices and certain memory components.

The applications 340 can be stored in the memory 330 and/or in a firmware (not shown) as executable instructions, and can be executed by the processor 310. The applications 340 include various programs that implement the various features of the device 300. For example, the applications 340 may include an email application (that acts as a client of the email server 180) and a parsing application.

The database 350 represents the static and dynamic data used by the applications 340, the OS 360, the I/O device drivers 370 and other software programs that may reside in the memory. The database may 350 may be used to store subscriber profiles from the subscriber devices, content received from the subscriber devices, and information for authenticating email messages from the subscriber devices.

While the memory 330 is illustrated as residing proximate the processor 310, it should be understood that at least a portion of the memory 330 can be a remotely accessed storage system, for example, a server on a communication network, a remote hard disk drive, a removable storage medium, combinations thereof, and the like. Thus, any of the data, applications, and/or software described above can be stored within the memory 330 and/or accessed via network connections to other data processing systems (not shown) that may include a local area network (LAN), a metropolitan area network (MAN), or a wide area network (WAN), for example.

Figure 4:
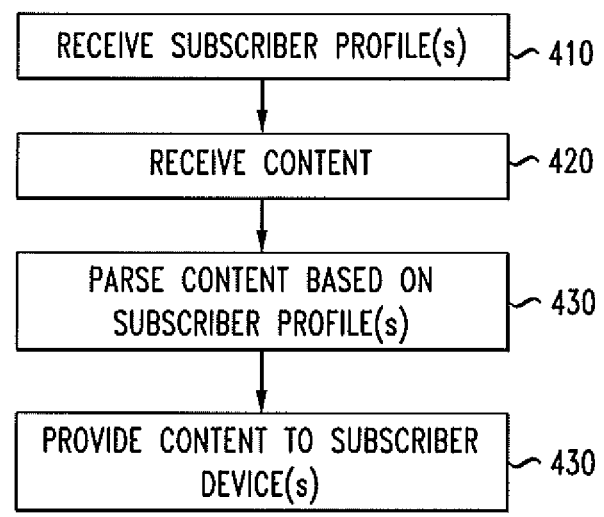
FIG. 4 is a flow chart illustrating a method for distributing content according to an exemplary embodiment.

FIG. 4 is a flow chart illustrating a method for distributing content according to an exemplary embodiment. It should be understood that the steps or other interactions of the illustrated method are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

Referring to FIG. 4, subscriber profile(s) are received at the gateway 150 at step 410 from at least one of the subscriber devices 125A, 125B, 125C, 125D, 125E and 125F. The subscriber profiles may be received at the gateway 150, via the email server 180, as part of electronic mail messages addressed to the gateway 150 from the subscriber devices with which the subscriber profiles are associated. Each subscriber profile indicates content in which an authorized user of a subscriber device is interested. At step 420, the gateway 150 receives content. The content is received by the gateway 150 via the email server 180, in an electronic mail message addressed to the gateway. The content may be received from any number of subscriber devices. It should be appreciated that although steps 410 and 420 are shown as separate steps, subscriber profiles and content may be received at the same time, e.g., in the same email message. Also, new subscriber profile(s) may be received, old subscriber profiles may be updated, and content may be received at any time.

At step 430, the parser 175 included in the gateway 150 parses the received content to determine whether it contains content in which the subscriber profile(s) have indicated an interest. At step 440, responsive to determining that the received content contains content that a subscriber profile has indicated an interest in, the gateway 150 provides the content to the subscriber device associated with the subscriber profile indicating an interest in the content (via the email server 180).

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method of distributing electronic mail message content between subscriber devices, comprising:
   receiving, by a gateway, a subscriber profile from at least one subscriber device, wherein the subscriber profile indicates content in which a user associated with the subscriber device is interested, and wherein the subscriber device includes an electronic mail client;
   receiving, by the gateway, electronic mail message content from at least one other subscriber device in an electronic mail message addressed to the gateway;
   parsing the received electronic mail message content to determine whether the received electronic mail message content contains the content in which the subscriber profile indicates an interest; and
   responsive to determining that the electronic mail message content received from the other subscriber device contains the content in which the subscriber profile indicates an interest, providing, by the gateway, the electronic mail message content received from the other subscriber device to the subscriber device.

2. The method of claim 1, wherein subscriber profiles are received from a plurality of subscriber devices.

3. The method of claim 2, wherein parsing includes determining which subscriber profiles indicate an interest in the received electronic mail message content.

4. The method of claim 3, wherein the received electronic mail message content is provided to the subscriber devices from which subscriber profiles are received that indicate an interest in the received electronic mail message content.

5. The method of claim 1, wherein parsing includes at least one of:
   matching at least one hash tag in the received electronic mail message content with at least one hash tag included in the subscriber profile;
   matching at least one key word in the received electronic mail message content with at least one key word included in the subscriber profile; and
   matching a script in the received electronic mail message content with at least one script included in the subscriber profile.

6. The method of claim 1, wherein providing the electronic mail message content comprises sending the received electronic mail message content in an electronic mail message addressed to the subscriber device.

7. The method of claim 1, wherein the gateway receives electronic mail message content from a plurality of other subscriber devices, and the subscriber profile indicates which other subscriber devices the user associated with the subscriber device is interested in receiving content from and which other subscriber devices are authorized to send content to the subscriber device via the gateway.

8. The method of claim 1, wherein the electronic mail message includes a task and the method further comprises:
   determining, by the gateway, whether the subscriber profile received from the subscriber device indicates an interest in the task and an authorization to assign the task; and
   responsive to determining that the subscribe profile received from the subscriber device indicates an interest in the task and an authorization to assign the task:
      assigning the task to the subscriber device; and
      purging the task such that if another subscriber profile indicates an interest in the task, the task will not be reassigned.

9. A gateway, comprising:
   a processor; and
   a memory having instructions stored thereon which, when executed by the processor, cause the processor to perform operations for distributing electronic mail content between subscriber devices, the operations comprising:
      receiving a subscriber profile from at least one subscriber device, wherein the subscriber profile indicates content in which a user associated with the subscriber device is interested, and wherein the subscriber device includes an electronic mail client;
      receiving electronic mail message content in an electronic mail message from at least one other subscriber device;
      parsing the received electronic mail message content to determine whether the received electronic mail message content contains the content in which the subscriber profile indicates an interest; and
      responsive to determining that the electronic mail message content received from the other subscriber device contains the content in which the subscriber profile indicates an interest, providing the electronic mail message content received from the other subscriber device to the subscriber device.

10. The gateway of claim 9, wherein the operations further comprise receiving subscriber profiles from a plurality of subscriber devices.

11. The gateway of claim 10, wherein parsing includes determining which subscriber profiles indicate an interest in the received electronic mail message content.

12. The gateway of claim 11, wherein the received electronic mail message content is provided to the subscriber devices from which subscriber profiles are received that indicate an interest in the received electronic mail message content.

13. The gateway of claim 9, wherein parsing includes at least one of:

matching at least one hash tag in the received electronic mail message content with at least one hash tag included in the subscriber profile;

matching at least one key word in the received electronic mail message content with at least one key word included in the subscriber profile; and matching at least one script in the received electronic mail message content with at least one script included in the subscriber profile.

14. The gateway of claim 9, wherein providing the received content comprises sending the received electronic mail message content in an electronic mail message addressed to the subscriber device.

15. A computer readable storage device, included in a gateway, having instructions recorded thereon which, when executed by a processor, cause the processor to perform operations for distributing electronic mail content between subscriber devices, the operations comprising:

receiving a subscriber profile from at least one subscriber device, wherein the subscriber profile indicates content in which a user associated with the subscriber device is interested, and wherein the subscriber device includes an electronic mail client;

receiving electronic mail message content in an electronic mail message from at least one other subscriber device;

parsing the received electronic mail message content to determine whether the received electronic mail message content contains the content in which the subscriber profile indicates an interest; and responsive to determining that the electronic mail message content received from the other subscriber device contains the content in which the subscriber profile indicates an interest, providing the electronic mail message content received from the other subscriber device to the subscriber device.

16. The computer readable storage device of claim 15, wherein the instructions further cause the processor to receive subscriber profiles from a plurality of subscriber devices.

17. The computer readable storage device of claim 16, wherein parsing includes determining which subscriber profiles indicate an interest in the received electronic mail message content.

18. The computer readable storage device of claim 17, wherein the received electronic mail message content is provided to the subscriber devices from which subscriber profiles are received that indicate an interest in the electronic mail message content.

19. The computer readable storage device of claim 15, wherein parsing includes at least one of:

matching at least one hash tag in the received electronic mail message content with at least one hash tag included in the subscriber profile;

matching at least one key word in the received electronic mail message content with at least one key word included in the subscriber profile; and matching at least one script in the received electronic mail message content with at least one script included in the subscriber profile.

20. The computer readable storage device of claim 15, wherein providing the received electronic mail message content comprises sending the received electronic mail message content in an electronic mail message addressed to the subscriber device.

* * * * *